(12) United States Patent
Golan (10) Patent No.: US 10,462,286 B2
(45) Date of Patent: Oct. 29, 2019

(54) SYSTEMS AND METHODS FOR DERIVING CONTACT NAMES

(71) Applicant: Vonage Business Inc., Atlanta, GA (US)

(72) Inventor: Yuval Golan, Rishon Le Zion (IL)

(73) Assignee: Vonage Business, Inc., Atlanta, GA (US)

( * ) Notice: Subject to any disclaimer, the term of this patent is extended or adjusted under 35 U.S.C. 154(b) by 26 days.

(21) Appl. No.: 15/250,520

(22) Filed: Aug. 29, 2016

(65) Prior Publication Data

US 2018/0063321 A1  Mar. 1, 2018

(51) Int. Cl.
*H04M 3/42* (2006.01)
*H04M 3/533* (2006.01)
*H04M 1/2745* (2006.01)
*H04M 1/57* (2006.01)
*H04M 1/253* (2006.01)

(52) U.S. Cl.
CPC . *H04M 3/42042* (2013.01); *H04M 1/274516* (2013.01); *H04M 1/575* (2013.01); *H04M 3/53366* (2013.01); *H04M 1/2535* (2013.01); *H04M 2201/20* (2013.01); *H04M 2201/36* (2013.01)

(58) Field of Classification Search
CPC .. G06F 17/30746; G06F 16/685; G06F 17/30; H04M 3/42042; H04M 1/72519; H04M 1/72552; H04M 1/725; H04M 3/42
USPC .......... 379/85, 201.01, 88.16, 88.22, 142.02, 379/201.04, 211.02; 455/414.1, 566, 415, 455/41.1; 709/206; 370/392; 704/235; 705/14.45; 715/205
See application file for complete search history.

(56) References Cited

U.S. PATENT DOCUMENTS

| | | | | |
|---|---|---|---|---|
| 6,249,570 | B1* | 6/2001 | Glowny | G11B 31/00 379/111 |
| 7,839,987 | B1* | 11/2010 | Kirchhoff | H04M 3/42195 379/142.01 |
| 8,571,528 | B1* | 10/2013 | Channakeshava | H04M 3/42221 379/201.01 |
| 2007/0098145 | A1* | 5/2007 | Kirkland | H04M 1/2745 379/201.01 |
| 2007/0239837 | A1* | 10/2007 | Jablokov | G06Q 30/0251 709/206 |
| 2009/0276417 | A1* | 11/2009 | Shapira | G06F 17/30746 |
| 2011/0228913 | A1* | 9/2011 | Cochinwala | H04M 3/42221 379/85 |
| 2011/0287810 | A1* | 11/2011 | Zelber | H04M 1/56 455/566 |
| 2012/0196581 | A1* | 8/2012 | Papakipos | H04L 51/046 455/415 |
| 2013/0267172 | A1* | 10/2013 | Ko | H04B 5/0031 455/41.1 |
| 2015/0341499 | A1* | 11/2015 | Korsei | G06F 16/9558 715/205 |
| 2016/0036969 | A1* | 2/2016 | Kau | H04M 3/42221 379/85 |
| 2018/0063321 | A1* | 3/2018 | Golan | H04M 3/42042 |

* cited by examiner

*Primary Examiner* — Gerald Gauthier
(74) *Attorney, Agent, or Firm* — FisherBroyles, LLP; Joseph Pagnotta (57) ABSTRACT

Systems and methods for deriving contact information for a calling party analyze all or a portion of the audio of the telephone call to derive such contact. Likewise, all or a portion of a voice message left by a calling party could be analyzed to obtain contact information for the calling party.

17 Claims, 8 Drawing Sheets

SYSTEMS AND METHODS FOR DERIVING CONTACT NAMES

BACKGROUND OF THE INVENTION

The invention is related to deriving a contact name for a party that initiated a telephony communication, such as a telephone call.

When a calling party places a telephone call to a called party's telephony device, the called party's telephony device may be configured to try to identify the name of the calling party. Caller ID information that is received by the called party's telephony device can include the calling party's telephone number. The called party's telephony device performs a check to determine if the calling party's telephone number is present in a contact list that is maintained for the called party. If so, the telephone number may be associated with a name, and possibly also a business name. If the called party's telephony device finds that the calling party's telephone number is present in the called party's contact list, and that a name and/or business name is associated with that telephone number, the called party's telephony device may display that name and/or business name to the called party so that the called party knows who is calling.

The called party's telephony device also is often configured to keep a log of all incoming telephone calls and outgoing calls. The call log will typically list the telephone number of each incoming telephone call, along with the time that the call was received, and possibly information about a duration of the incoming call. If the called party's telephony device was able to identify a contact name for the calling party, the contact name may also appear in the call log.

When a called party's telephony device receives an incoming telephone call, and is unable to locate the calling party's telephone number in the called party's contact list, then the called party's telephony device will typically display only the calling party's telephone number to the called party when the call is first received. Also, because the called party's telephony device was unable to locate a contact name associated with the calling party's telephone number, any entry in a call log for the incoming telephone call also will lack a contact name.

It would be desirable to have some alternate means for identifying a contact name associated with a calling party when a lookup in the called party's contact list fails to yield a contact name.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
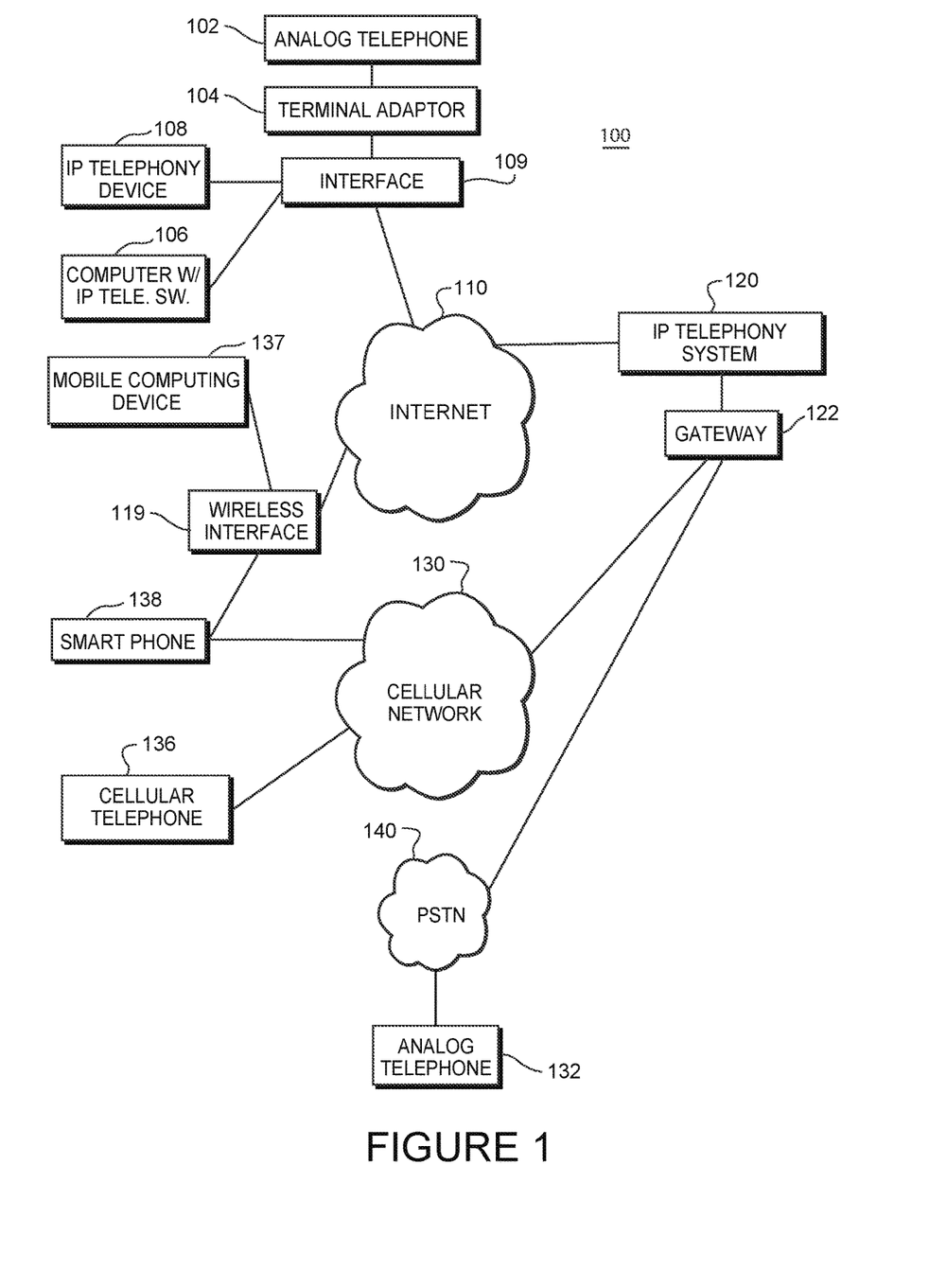
FIG. 1 is a diagram of a communications environment including various elements which are associated with an Internet protocol (IP) telephony system operating in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 140 and a cellular telephony network 130 via one or more gateways 122.

The gateway 122 allows users and devices that are connected to the PSTN 140 and cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephony device 108 that is connected to the Internet 110 via an interface 109. Such an IP telephony device 108 could be connected to an Internet service provider via a wired connection or via a wireless router.

Alternatively, a customer could utilize a normal analog telephone 102 which is connected to the Internet 110 via a terminal adapter 104 and the interface 109. The terminal adapter 104 converts analog signals from the telephone 102 into digital data signals that pass over the Internet 110, and vice versa. Analog telephony devices include, but are not limited to, standard telephones and document imaging devices such as facsimile machines.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a terminal adaptor 104 that is connected to one or more analog telephones 102.

Likewise, a mobile computing device 137 may be used to send and receive telephony communications via the IP telephony system 120. The mobile computing device 137 could establish a data connection to the Internet 110 via a wireless interface 119, such as a WiFi router. IP telephony software on the mobile computing device 137 could then be used to conduct telephony communications through the IP telephony system 120.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. Likewise, a third party using a cellular telephone 136 could also place a call to an IP telephony system customer, and the connection would be established in a similar manner, although the first link would involve communications between the cellular telephone 136 and a cellular telephony network 130.

In addition, a smartphone 138 that includes both mobile computing capabilities and cellular telephony capabilities can connect to the cellular network 130 using its cellular telephone capabilities. However, the smartphone 138 also may establish a data connection to the IP telephony system 120 via a wireless interface 119 and the Internet 110. In this instance, communications between the smartphone 138 and other parties could be entirely carried by data communications. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephony device 108 located in a country outside the U.S. to access the services. Likewise, the customer could also utilize a computer with IP telephony software 106 or a mobile computing device with IP telephony software 137 outside the U.S. to access the IP telephony system 120. Further, in some instances a user could place a telephone call with the analog telephone 132 or the cellular telephone 136 that is routed through the PSTN 140 or cellular network 130, respectively, to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 140 or cellular network 130.

Figure 2:
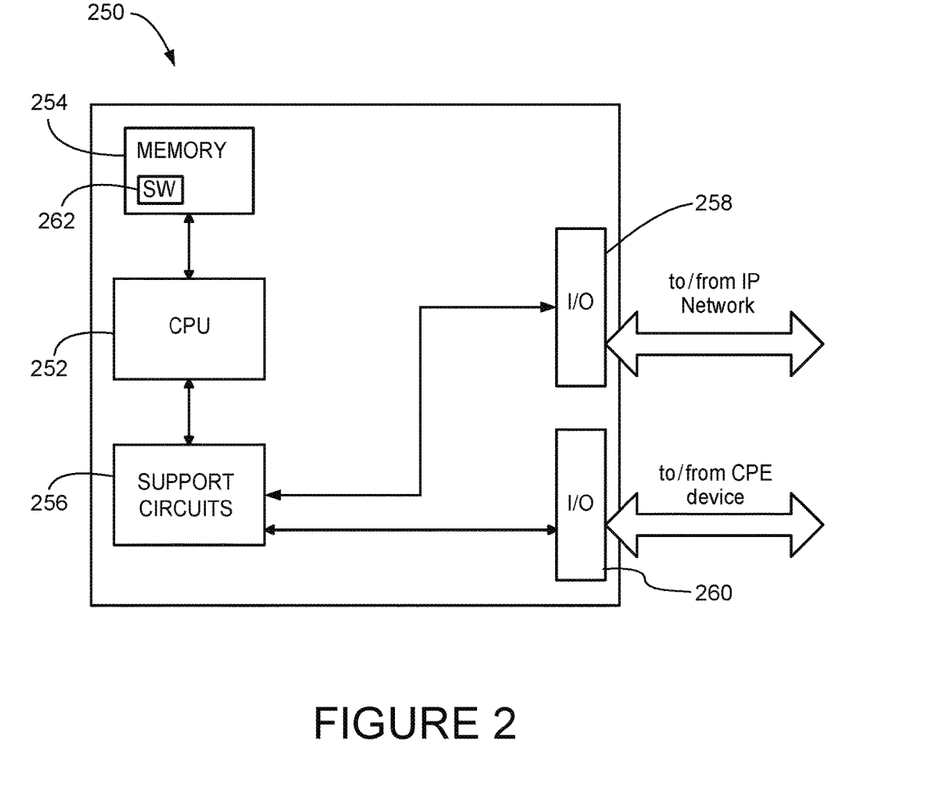
FIG. 2 is a diagram of various elements of a processor that forms part of an IP telephony system and/or part of a language translation setting unit and/or user's telephony device.

FIG. 2 illustrates elements of a computer processor 250 that can be used as part of the IP telephony system 120, as part of a contact information unit, or as part of a user's telephony device, to accomplish various functions. An IP telephony system 120, a contact information unit and a telephony device could all include multiple processors 250, along with their respective operating components and programming, each carrying out a specific or dedicated portion of the functions performed by the IP telephony system 120, by the contact information unit, or by the telephony device.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120, a contact information unit and/or a user's telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to a "telephony device." This term is used to refer to any type of device which is capable of interacting with a telephony system to conduct or participate in a telephony communication. This includes traditional analog telephones, cellular telephones, IP telephones configured to conduct telephony communications via IP data communications, as well as other computing devices which can be configured to conduct telephony communications via data communications, such as a computer running IP telephony software. Because various different computing devices can be configured to conduct telephony communications via a data network, a single device might be capable of operating as both a computing device and as a telephony device.

Certain devices that are not traditionally used as telephony devices may act as telephony devices once they are configured with appropriate client software. One example would be a desktop or a laptop computer that is running software that can interact with an IP telephony system over a data network to conduct telephone calls. Another example would be a portable computing device, such as an Apple iPod Touch™ or an Apple iPad™, which includes a speaker and a microphone. A software application loaded onto an Apple iPad™ can be run so that the Apple iPad™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

The systems and methods disclosed in the present application are designed to assist a called party in identifying a calling party when the called party receives a telephone call or a voice message from the calling party.

When a called party's telephony device receives an incoming telephone call, the called party's telephony device may or may not receive caller ID information for the incoming telephone call. If no caller ID information is provided, the called party's telephony device will have no way of alerting the called party as to the identity of the calling party. Moreover, when the called party's telephony device makes an entry into a call log for the incoming telephone call, the call log entry will not include either the telephone number of the calling party, or the calling party's name.

In those instances where caller ID information provides the calling party's telephone number, but not the calling party's name, the called party's telephony device can conduct a lookup operation in the called party's contact list to determine if there is a contact within the list that has the telephone number of the calling party. If the called party's telephony device is unable to locate a contact with the calling party's telephone number, the called party's telephony device is again unable to display to the called party a name associated with the calling party. In addition, when the called party's telephony device creates a call log entry for the incoming telephone call, although the calling party's telephone number can be listed, no contact name for the calling party can be listed in the call log.

The systems and methods disclosed in the present application are designed to assist a called party in identifying the calling party when an incoming telephone call is received. As will be explained in detail below, the systems and methods may also aid the called party in inserting an appropriate contact name in a call log entry for the incoming telephone call or in a voicemail log listing voicemail messages. The claimed systems and methods may also assist a called party in creating a new contact in the called party's contact list for a calling party.

Figure 3:
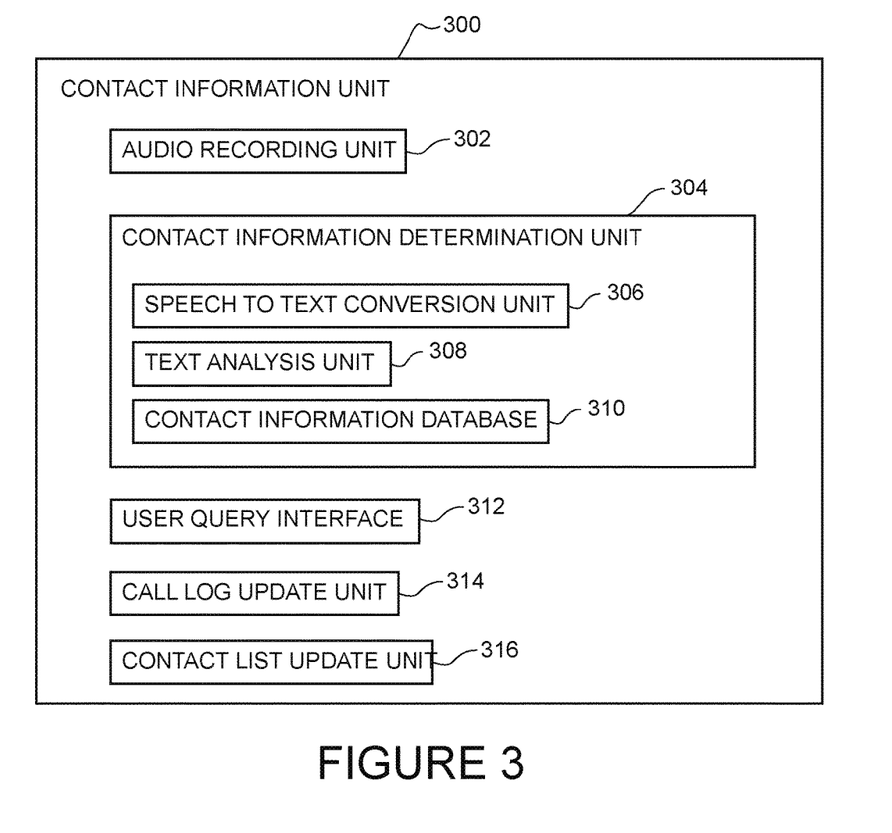
FIG. 3 is a block diagram illustrating elements of a contact information unit.

FIG. 3 illustrates selected elements of a contact information unit 300 which is designed to help identify a calling party as described above. The contact information unit 300 could be resident on a telephony device, or the contact information unit 300 could be located within a telephony system, such as the IP telephony system 120 illustrated in FIG. 1. Moreover, some of the elements of the contact information unit 300 could be resident on a telephony device, while other elements of the contact information unit could be located on a telephony system.

The contact information unit 300 includes an audio recording unit 302 that is configured to record all or a portion of a telephone call or a voicemail message. A contact information determination unit 304 utilizes the audio recorded by the audio recording unit to attempt to identify the name and possibly a business associated with a calling party, as will be explained in detail below. The contact information determining unit 304 includes a speech-to-text conversion unit 306, a text analysis unit 308 and a contact information database 310.

The contact information unit 300 also includes a user query interface 312 which is configured to pose various queries to a user, and to receive an interpret user responses to those queries. A call log update unit 314 updates a call log for a telephony device, or for a user. A contact list update unit 316 is configured to update contact information stored in a user's contact list. The contact list update unit 316 may also add new contacts to a user's contact list based on information derived from a telephone call or a voicemail message.

As mentioned above, the contact information unit 300 depicted in FIG. 3 may be resident on a user's telephony device, or the contact information unit 300 could be part of a telephony system. For purposes of the following example, we will assume that the contact information unit 300 is resident on a called party's telephony device.

Figure 4:
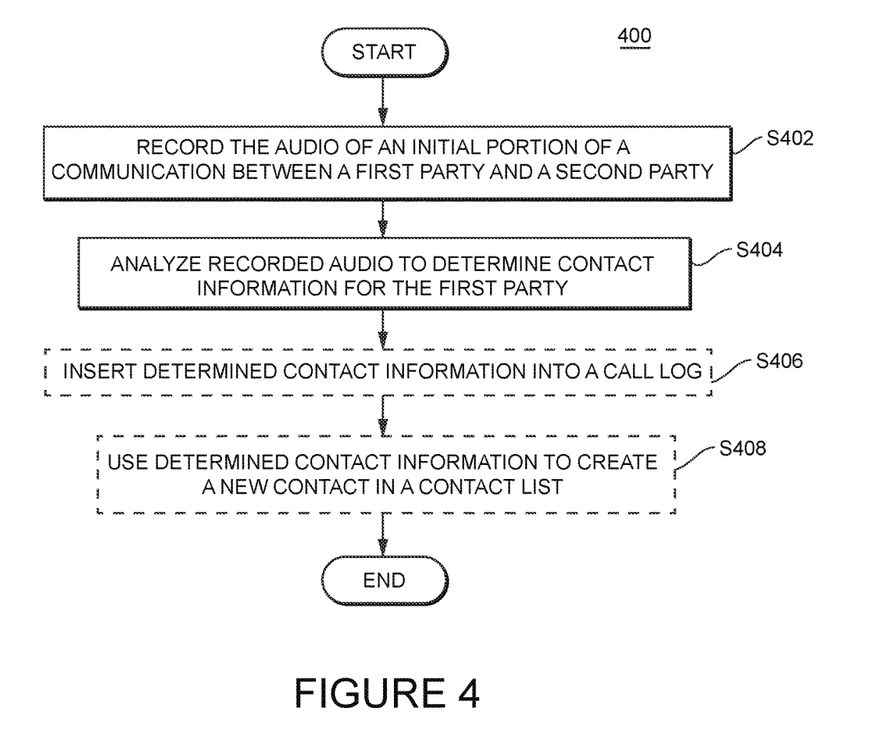
FIG. 4 is a flow diagram illustrating steps of a method of deriving contact information from the audio of a telephone call or voice message and for recording that contact information as desired.

FIG. 4 illustrates steps of a method that may be performed by the contact information unit 300 to derive contact information relating to a calling party when a called party's telephony device receives an incoming telephone call from the called party, and when there is no match in the called party's contact list for the calling party. The method 400 begins immediately after the called party's telephony device receives and sets up the incoming telephone call from the called party. The method proceeds to step S402, where the audio recording unit 302 of a contact information unit 300 on the called party's telephony device records the audio of at least an initial portion of the telephone call. The method then proceeds to step 404, where the contact information determination unit 304 analyzes the recorded audio in an attempt to determine a name, and possibly a business, associated with the calling party. In alternate embodiments, additional types, forms or categories of information could also be extracted from the recorded audio.

Figure 5:
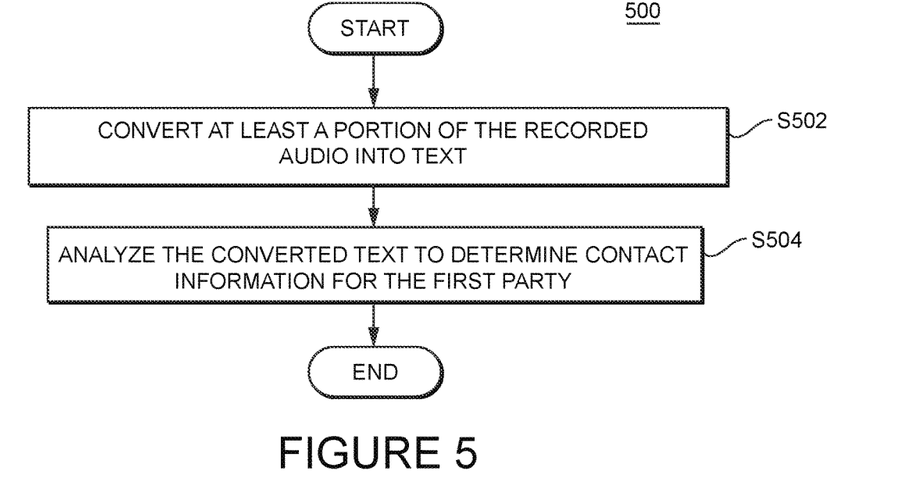
FIG. 5 is a flow diagram that illustrates steps of a first method of analyzing audio from a telephone call or voice message to derive contact information.

FIG. 5 illustrates a method that could be performed by the contact information determination unit 304 to analyze the recorded audio of the telephone call. As illustrated in FIG. 5, the method begins once at least an initial portion of the telephone call has been recorded by the audio recording unit 302. The method proceeds to step S502, where the speech-to-text conversion unit 306 converts the recorded audio into text. The method then proceeds to step S504, wherein the text analysis unit 308 analyzes the converted text to try to determine the name of the calling party, and possibly a business associated with the calling party.

The text analysis unit 308 could operate in many different ways to attempt to determine the name of the calling party. In some embodiments, the text analysis unit 308 could be configured to identify key phrases that often occur during the initial portion of a telephone call, such as "Hello, my name is . . . " or "Good afternoon, this is . . . " If the text analysis unit identifies such a key phrase, the audio that comes immediately thereafter will likely be the name of the calling party. Thus, the text analysis unit 308 could identify the calling party name by first identifying key phrases within the converted text that typically precede a calling party's name.

In other embodiments, the text analysis unit 308 may simply look for typical person names in the converted text of the initial portion of the telephone conversation. Many individuals do not immediately introduce themselves when answering a telephone call. In contrast, most calling parties will identify themselves once the called party answers the call. As a result, any names appearing in the converted text of the initial portion of a telephone call are likely to be the name of the calling party.

In a similar fashion, in some embodiments the text analysis unit 308 could be configured to determine a business name associated with the calling party based on the converted text. Here again, the text analysis unit 308 could look for ley words or phrases to help identify the business name. For example, the text analysis unit could look for the phrase "This is (name) from (business name) . . . " If this pattern is found in the converted text, the name appearing after the word "from" is likely the business name. Similarly, the text analysis unit 308 could look for key words such as "corporation," or "Bank," or "company." When found, the name preceding the key word will likely be the business name.

Returning now to the method illustrated in FIG. 5, once the text analysis unit 308 attempts to identify a name of the calling party, and perhaps a business name, from the converted text, the method end. If the method illustrated in FIG. 5 was step S404 of the larger method illustrated in FIG. 4, the method in FIG. 4 would then proceed to optional step S406.

In optional step S406, a contact name derived from the recorded audio of the telephone call is inserted into a call log of the called party's telephony device. Step S406 could be accomplished by the method illustrated in FIG. 6. This method 600 begins once the contact information determination unit 304 has derived a contact name, and possibly a business name, from the audio of the telephone call. The method 600 begins and proceeds to step S602, where a user query interface 312 of the contact information unit 300 causes a query to be played to the called party. The query asks the called party if the derived contact information should be added to an entry for the telephone call in a call log of the called party's telephony device. The query could be displayed to the called party on a display screen, or the query could be an audio query that is played to the called party. In other embodiments, the query could include both audio and displayed information.

Figure 6:
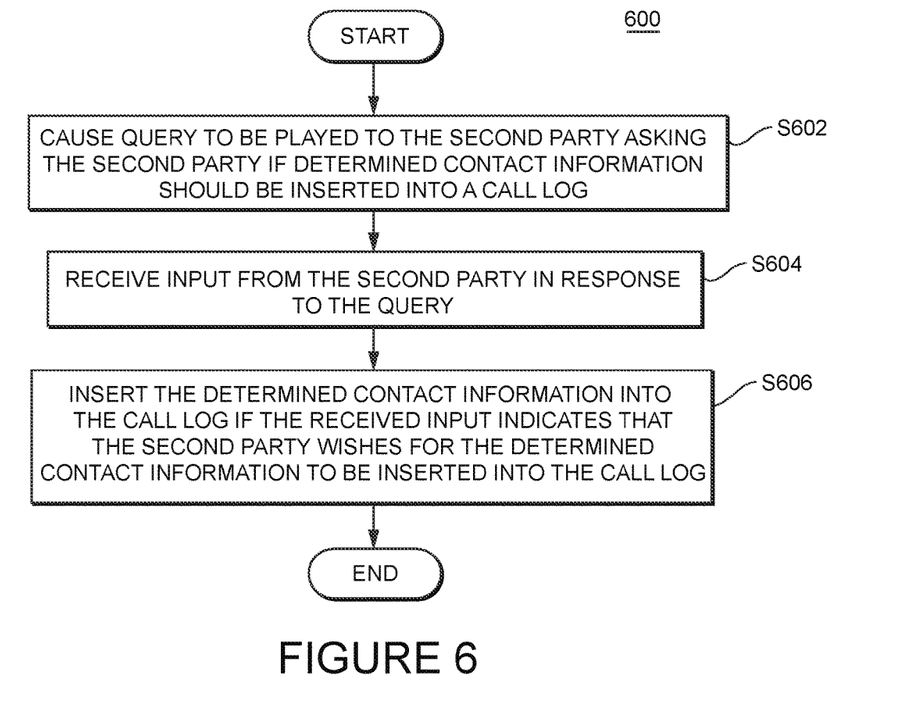
FIG. 6 is a flow diagram that illustrates steps of a method for recording contact information in a call log.

In step S604, the user query interface 312 receives input from the called party, the input indicating whether the derived contact information should be added to the entry in the call log for the telephone call. The method then proceeds to step S606, where the derived contact information is added to the call log entry if the called party indicates it should be added.

In some embodiments, the contact information or the entire call log entry may be marked in some fashion to indicate that the displayed contact information was obtained or derived from an analysis of the audio of the telephone call. Such derived contact information could be viewed as suspect, and marking the contact information in this way would signal to the called party that the derived contact information may not be reliable.

The way that contact information or a call log entry is marked could vary depending on user preferences or other factors. The contact information or the call log entry could be displayed in a different fashion from other elements in the call log, such as by using a different font or type size, by highlighting, by using a particular color, or through other means. Alternatively, or in addition, the contact information or call log entry could an icon or marker, or some other indicator which informs the user that the contact information was derived from an analysis of the audio of the telephone call. Of course, various other methods could be used to flag the contact information or call log entry.

In some embodiments, the contact information or the call log entry might only be marked if a confidence score associated with the analysis of the audio falls below a threshold level. For example, when the audio is analyzed, the contact information determination unit 304 may calculate a confidence score which represents a confidence that the derived contact information (or some other item of information) is correct. This could be expressed as a percentage value or as a number. The confidence score could be based on any number of different criteria, to include the quality of the original audio, the likelihood that the speech-to-text conversion has been properly conducted, as well as various other factors. If the derived contact information has been obtained using machine learning techniques, this could also play into the confidence score.

The confidence score could then be compared to a threshold value. The threshold value may be adjustable based on user preferences or various other factors. If the confidence score is equal to or above the threshold value, the call log entry may not be marked in any fashion to indicate that the contact information was derived from an analysis of the audio of the telephone call. If the confidence score is below the threshold, then the contact information or the entire call log entry may be so marked. In still other embodiments, the contact information or the entire call log entry may be marked in different ways depending on how high the confidence score is. For example, the contact information or the call log entry could be marked green if the confidence score is quite high, it could be marked yellow if the confidence score is a mid-level value, and it could be marked red if the confidence score is low.

Although the method illustrated in FIG. 6 involves asking the called party if derived contact information should be added to the call log entry, in alternate embodiments, optional step S406 of the method illustrated in FIG. 4 could involve automatically adding derived contact information to the called party's call log. Here again, the derived contact information could be marked in some fashion to indicate that the contact information was derived from an analysis of the audio of the telephone call.

In some embodiments, step S406 may be performed immediately after the telephone call with the calling party ends. In still other embodiments, step S406 could be performed at some other time.

In fact, steps S402 and S404 of the method illustrated in FIG. 4 could be performed while the telephone call between the calling party and the called party is ongoing. In alternate embodiments, these steps could be performed immediately after the telephone call ends, or at some other point in time after the call has ended.

After optional step S406 of the method illustrated in FIG. 4 has been performed, the method proceeds to optional step S408, where the derived contact information is used to create a new contact in the called party's contact list. Step S408 could be performed according to the method illustrated in FIG. 7. The method illustrated in FIG. 7 would be performed after contact information has been derived from the audio of the telephone call. This step could be performed while the telephone call is ongoing, immediately after the call ends, or at some other point in time after the call has ended.

Figure 7:
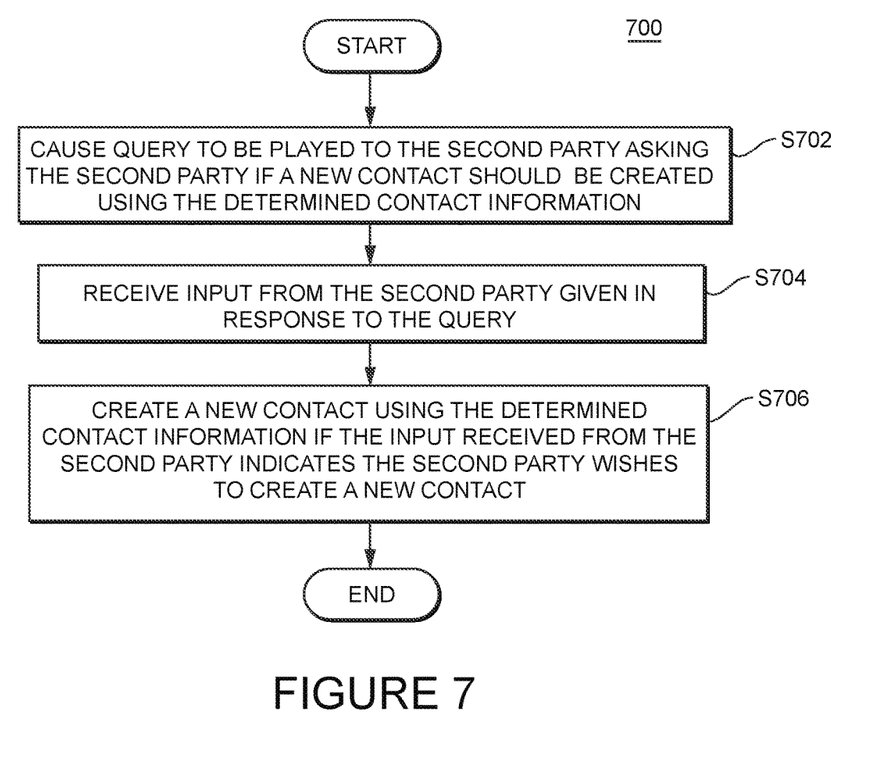
FIG. 7 is a flow diagram that illustrates steps of a method for generating a new contact in a contact list using derived contact information.

The method 700 begins and proceeds to step S702, where the user query interface 312 causes a query to be played or displayed to the called party. The query could be played or displayed on the called party's telephony device, or on some other device. The query asks the called party if the called party would like to use the derived contact information to create a new contact in the called party's contact list.

In step S704 the user query interface 312 receives input from the called party that indicates whether the called party wishes to create a new contact. The method then proceeds to step S706 where a call log update unit 314 creates a new contact entry in the called party's contact list for the calling party, should the user wish to have the new contact created. The contact could include a name of the calling party and possibly a business name, both of which have been derived from an analysis of the audio of the telephone call. The contact could also include a telephone number of the calling party which was obtained through the caller ID information that was transmitted to the called party's telephony device during setup of the telephone call.

In instances where the called party chooses to have a new contact created in the called party's contact list, the call log entry for the telephone call may be automatically updated to include certain information from the new contact entry. Also, if the called party's call log was originally updated to include the contact information derived from an analysis of the audio of the telephone call, but the contact information or call log entry was marked to indicate that the information was derived from the audio of the telephone call, the marking may be removed if the called party also creates a new contact entry in the called party's contact list.

In some embodiments, the contact entry, or selected portions of the contact entry, may be marked to indicate that the information was derived from an analysis of the audio of a telephone call. For example, the telephone number, which was received as caller ID information, may not be flagged in this fashion because there is a high degree of certainty that the telephone number is correct. The contact's name, however, may be marked to indicate that this information came from an analysis of the audio of a telephone call.

In the methods discussed above, we assumed that all or some of the steps were performed by a contact information unit 300 resident on the called party's telephony device. In alternate embodiments, some or all of the elements of the contact information unit 300 may be resident on a different device, such as a network server. A remote contact information unit 300 could be part of a telephony system. If that is the case, the called party's telephony device may communicate with the remote contact information unit 300 via data communications that pass over a data network, such as the Internet.

Figure 8:
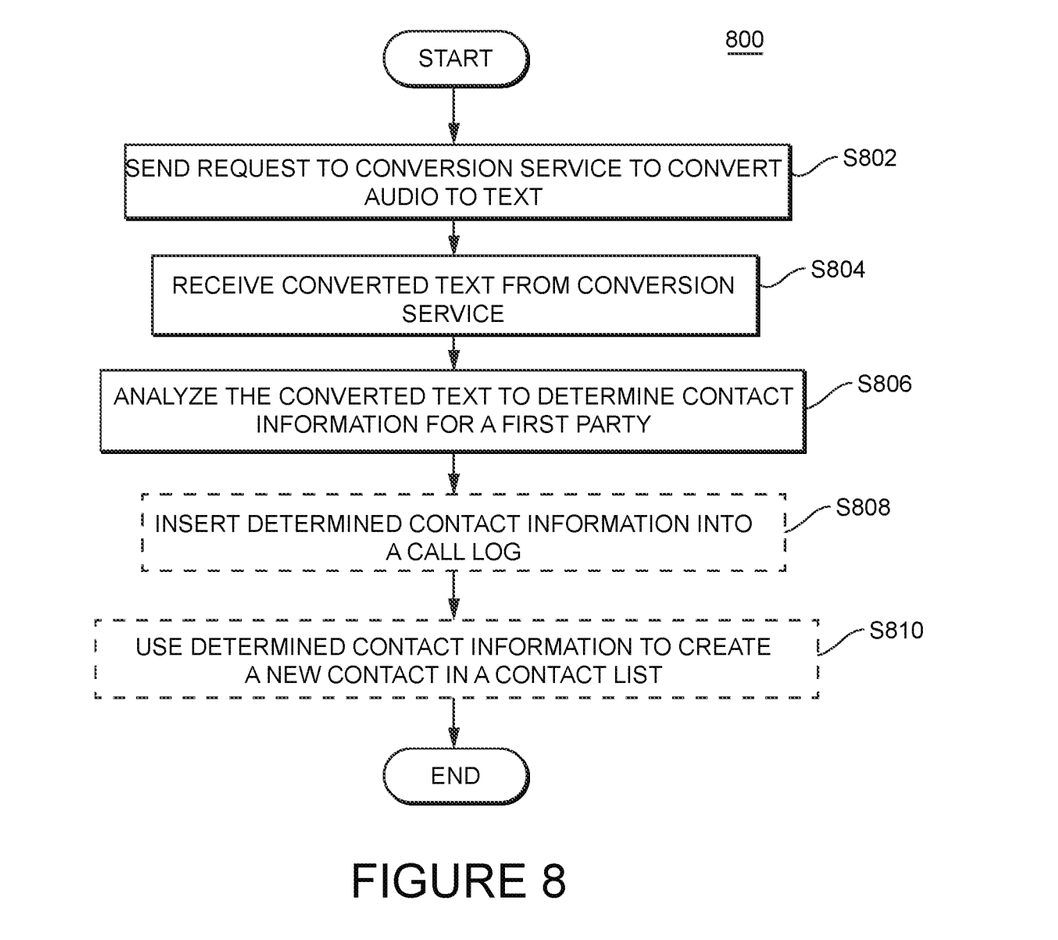
FIG. 8 is a flow diagram that illustrates steps of a method for deriving contact information from audio of a telephone call or a voice message using a speech-to-text conversion service, and for recording the derived contact information as desired.

FIG. 8 illustrates steps of a method in which a called party's telephony device utilizes a remote service to convert all or a portion of the audio of a telephone call into text. The called party's telephony device then analyzes the converted text to derive contact information.

The method 800 begins and proceeds to step S802, where the called party's telephony device sends a request to a remote speech-to-text conversion unit 306. The remote speech-to-text conversion unit 306 could be part of a contact information unit 300 located on a remote device, such as a server of a telephony system. In alternate embodiments, the speech-to-text conversion unit 306 could be a stand-alone service that is available to the called party's telephony device.

In some embodiments, the called party's telephony device could send the audio that is to be converted to text to the speech-to-text conversion unit 306 along with the request that it be converted to text. In alternate embodiments, such as where the speech-to-text conversion unit 306 is part of a telephony system, the speech-to-text may already have access to a recording of the audio of the telephone call.

In step S804, the called party's telephony device receives back the converted text. In step S806 a text analysis unit 308 on the called party's telephony device analysis the text to derive contact information, as described above. In optional step S808, a call log update unit 314 on the called party's telephony device may add the derived contact information to a call log entry on a call log of the called party's telephony device. As mentioned above, the derived contact information may be marked to indicate that it was derived from an analysis of the audio of a telephone call.

In optional step S810, a contact list update unit 316 may use the derived contact information to create a new contact in the called party's contact list. Here again, the derived contact information may be marked in some fashion to indicate the contact information was derived from an analysis of the audio of a telephone call. In some embodiments, the contact list update unit 316 may use the derived contact information to add additional information to an existing contact entry in the called party's contact list. The method then ends.

Figure 9:
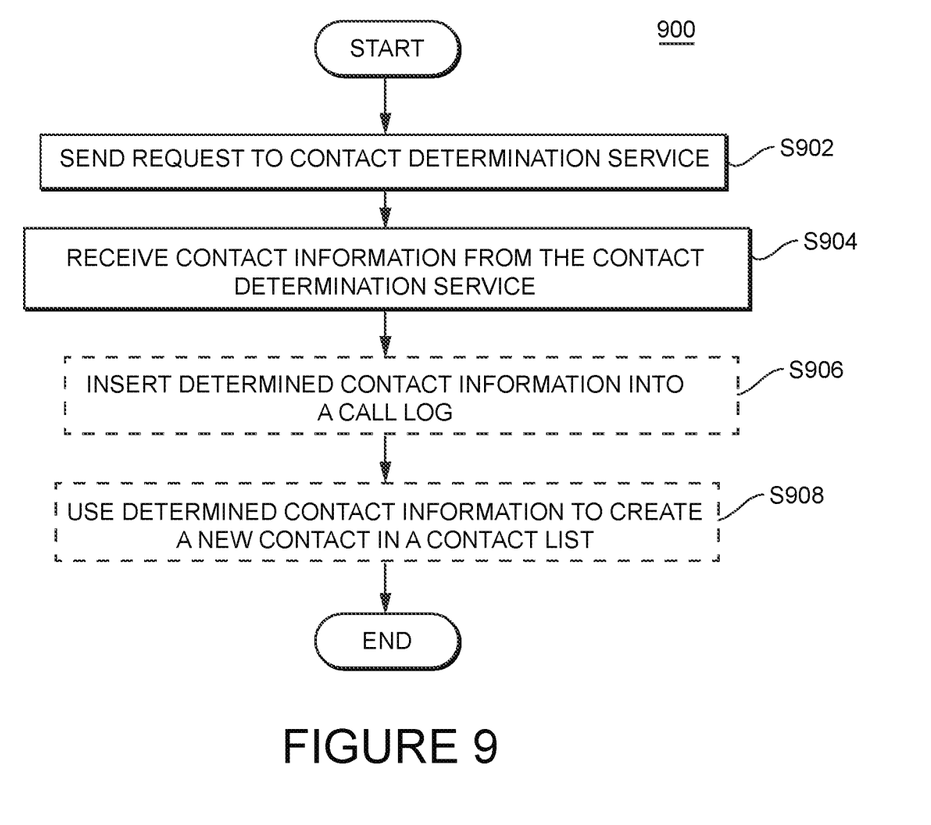
FIG. 9 is a flow diagram that illustrates steps of a method for deriving contact information from audio of a telephone call or a voice message using a separate contact information unit, and for recording the derived contact information as desired.

FIG. 9 illustrates steps of another method that would be performed by a called party's telephony device to obtain contact information for a calling party. In this method, the entire analysis to obtain contact information is performed by a remote device.

The method 900 begins and proceeds to step S902 where a called party's telephony device sends a request to a remote device asking for contact information for a calling party to be derived from audio of a telephone call between the calling and called parties. This step could be performed while the telephone call is ongoing, immediately after the telephone call ends, or at some other point in time. In some embodiments, the called party's telephony device could send audio from the telephone call to the remote device along with the request. In other instances, such as where the remote device is part of a telephony system that setup the telephone call, the remote device may have independent access to the audio of the telephone call, or a previously made recording of the audio of the telephone call. In some instances, the audio may only be the initial portion of the telephone call. In other instances, the audio may comprise a larger portion or all of the telephone call.

The remote device would then analyze the audio of the call to derive contact information for the calling party. In some instances, this could involve converting the audio to text and then analyzing the converted text. In other instances, the audio could be directly analyzed to derive contact information for the calling party. The analysis could be performed by a contact information unit 300 as illustrated in FIG. 3, which is resident on a remote computing device. In other instances, the analysis could be performed by some other device or service.

The method then proceeds to step S904 where the called party's telephony device receives contact information for the calling party back from the remote device or service. In optional step S906, a call log update unit 314 on the called party's telephony device may add the derived contact information to a call log entry on a call log of the called party's telephony device. As mentioned above, the derived contact information may be marked to indicate that it was derived from an analysis of the audio of a telephone call.

In optional step S908, a contact list update unit 316 may use the derived contact information to create a new contact in the called party's contact list. Here again, the derived contact information may be marked in some fashion to indicate the contact information was derived from an analysis of the audio of a telephone call. In some embodiments, the contact list update unit 316 may use the derived contact information to add additional information to an existing contact entry in the called party's contact list. The method then ends.

A contact information unit 300 as illustrated in FIG. 3 may also include a contact information database 310. The contact information database may include telephone numbers, names, business names and other information about contacts. This information could be added to the contact information database over time as the audio of various telephone calls is analyzed to derive contact information. Such a contact information database 310 may be particularly useful where the contact information unit 300 is resident on a server of a telephony system.

For example, if the contact information unit 300 is on a server of a telephony system, the telephony devices of multiple users of the telephony system can send requests to the contact information unit 300 for the analysis of the audio of telephone calls to derive contact information. Each time that a user's telephony device makes such a request the result of the analysis could be stored in the contact information database 310. Thus, when a first party receives a call from a calling party, audio of that telephone call would be analyzed to derive contact information for the calling party. The derived contact information would be stored in the contact information database against the calling party's telephone number. Then, when the contact information unit later receives a request from a second user for an analysis of audio of a telephone call that the second party had with the same calling party, contact information about the calling party will already be present in the contact information database. The telephone number of the calling party alone will be enough to locate and pull up the previously derived contact information for the calling party. In this instance, the contact information retrieved from the contact information database 310 using the calling party's telephone number can immediately be provided to the second party's telephony device without the need for a new analysis to be performed. Alternatively, or in addition, a new analysis could be performed using audio from the telephone call between the calling party and the second user to help refine the analysis of the calling party's contact information, or to add additional contact information regarding the calling party.

In another example, a contact information unit 300 with a contact information database 310 may be resident on a called party's telephony device. Information in the contact information database could then be used to facilitate operations for the called party. For example, assume that the first time the called party receives a telephone call from a calling party, an analysis of audio from the first telephone call yields contact information for the calling party, and that derived contact information is stored in the contact information database 310. However, the called party does not elect to create a new contact in his contact list for the calling party.

If the called party later receives a second telephone call from the calling party, the calling party's telephone number will be provided to the called party's telephone device during call setup. The calling party's telephone number could then be used to retrieve contact information for the calling party from the contact information database. That contact information, derived from the audio of the first telephone call, could be presented to the called party so that the called party knows who is calling. The displayed contact information for the calling party could be marked in some fashion to indicate that this contact information has not been retrieved from the called party's contact list, but rather the contact information was derived from the analysis of the audio of a previous telephone call.

The methods described above for deriving contact information from the audio of a telephone call could be performed automatically by a called party's telephony device anytime that an incoming call is from a telephone number that is not present in the called party's contact list. Alternatively, the methods could only be performed if the called party requests that contact information for a calling party be derived from the audio of a telephone call.

Also, the methods described above assume that audio of all or portion of a telephone call be used to derive contact information for the calling party. In other embodiments, all or a portion of a voice message left by a calling party could be used to derive contact information for the calling party.

Although some of the foregoing descriptions referred to an IP telephony system, the same basic methods could also be accomplished by an alternate type of telephony system, such as a traditional analog telephony system or a cellular telephony system. Thus, the use of an IP telephony system for purposes of describing the technology should in no way be considered limiting.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

Also, although many of the examples discussed above relate to telephony communications, those telephony communications could be audio or video calls, video conferences, or other forms of communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of determining contact information for a first party when the first party initiates a telephony communication with a second party, comprising:
   recording audio of at least an initial portion of a telephony communication between the first party and the second party;
   analyzing at least a portion of the recorded audio to determine contact information associated with the first party; and
   inserting the contact information associated with the first party into a call log entry associated with the telephony communication within a call log that is maintained for the second party.

2. The method of claim 1, wherein analyzing the recorded audio comprises:
   converting at least a portion of the recorded audio to text using a speech-to-text conversion technique; and
   analyzing the text to determine contact information for the first party.

3. The method of claim 1, further comprising marking the call log entry to indicate that the contact information associated with the first party that is added to the call log entry was derived from an analysis of the audio of the telephony communication.

4. The method of claim 1, further comprising:
   causing a query to be played or displayed to the second party, the query asking the second party if the contact information associated with the first party should be inserted into a call log entry associated with the telephony communication within a call log that is maintained for the second party;
   receiving input from the second party provided in response to the query; and
   inserting the contact information associated with the first party into the call log entry associated with the telephony communication only if the received input indicates that the second party wishes for the contact information associated with the first party to be inserted into the call log entry.

5. The method of claim 1, further comprising:
   causing a query to be played or displayed to the second party, the query asking the second party if a new contact entry should be created for the first party within a contact list that is maintained for the second party, the new contact entry including the determined contact information associated with the first party and an identifier associated with the first party that was obtained during setup of the telephony communication;
   receiving input from the second party provided in response to the query; and
   creating the new contact entry if the received input indicates that the second party wishes for the new contact entry to be created.

6. The method of claim 1, wherein analyzing the recorded audio also comprises analyzing at least a portion of the recorded audio to determine a name of the first party or a company name associated with the first party.

7. The method of claim 1, wherein the telephony communication is an attempt to setup a telephone call with the second party, wherein the first party is routed into a voicemail service, and wherein recording audio of at least an initial portion of the telephony communication comprises automatically recording at least a portion of a voicemail message left by the first party for the second party.

8. The method of claim 7, further comprising inserting the contact information associated with the first party into a voicemail log entry associated with the telephony communication within a voicemail log that is maintained for the second party.

9. A system for determining contact information for a first party when the first party initiates a telephony communication with a second party, comprising:
   means for recording audio of at least an initial portion of a telephony communication between the first party and the second party;
   means for analyzing at least a portion of the recorded audio to determine contact information associated with the first party; and
   means for inserting the contact information associated with the first party into a call log entry associated with the telephony communication within a call log that is maintained for the second party.

10. A system for determining contact information for a first party when the first party initiates a telephony communication with a second party, comprising:
    an audio recording unit comprising at least one processor that records audio of at least an initial portion of a telephony communication between the first party and the second party;
    a contact information determination unit comprising at least one processor that analyzes at least a portion of the recorded audio to determine contact information for the first party; and
    a call log update unit that inserts the contact information associated with the first party into a call log entry associated with the telephony communication within a call log that is maintained for the second party.

11. The system of claim 10, wherein the contact information determination unit comprises:
    a speech-to-text conversion unit that converts at least a portion of the recorded audio to text using a speech-to-text conversion technique; and
    a text analysis unit that analyzes the text to determine contact information for the first party.

12. The system of claim 10, wherein the call log update unit marks the call log entry to indicate that the contact information associated with the first party that is added to the call log entry was derived from an analysis of the audio of the telephony communication.

13. The system of claim 10, further comprising a user query interface that causes a query to be played or displayed to the second party, the query asking the second party if the contact information associated with the first party should be inserted into a call log entry associated with the telephony communication within a call log that is maintained for the second party, and that receives input from the second party provided in response to the query, and wherein the call log update unit inserts the contact information associated with the first party into the call log entry associated with the telephony communication if the received input indicates that the second party wishes for the contact information associated with the first party to be inserted into the call entry.

14. The system of claim 10, further comprising:
a user query interface that causes a query to be played or displayed to the second party, the query asking the second party if a new contact entry should be created for the first party within a contact list that is maintained for the second party, the new contact entry including the determined contact information associated with the first party and an identifier associated with the first party that was obtained during setup of the telephony communication, and that receives input from the second party provided in response to the query; and
a contact list update unit that creates the new contact entry if the received input indicates that the second party wishes for the new contact entry to be created.

15. The system of claim 10, wherein the contact information determination unit analyzes at least a portion of the recorded audio to determine name of the first party or a company name associated with the first party.

16. The system of claim 10, wherein the audio recording unit automatically records at least a portion of a voicemail message left by the first party for the second party.

17. The system of claim 16, wherein the call log update unit inserts the contact information associated with the first party into a voicemail log entry associated with the telephony communication within a voicemail log that is maintained for the second party.

* * * * *